(12) United States Patent
Holden et al.

(10) Patent No.: US 6,658,362 B1
(45) Date of Patent: Dec. 2, 2003

(54) METHOD AND APPARATUS FOR TESTING COMPONENTS

(75) Inventors: Thomas P. Holden, Sunnyvale, CA (US); Harold L. Longaker, Houston, TX (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/419,219

(22) Filed: Oct. 15, 1999

(51) Int. Cl.$^7$ .................................................. G01D 3/00
(52) U.S. Cl. ........................................... 702/108; 367/40
(58) Field of Search .............................. 702/75, 76, 77, 702/108, 122, 2, 9, 11, 14, 15, 16, 17; 367/13, 77, 140, 40; 341/143; 73/1.01, 1.85

(56) References Cited

U.S. PATENT DOCUMENTS

| | | | | |
|---|---|---|---|---|
| 3,858,169 A | * | 12/1974 | Bardeen | 367/140 |
| 4,003,018 A | * | 1/1977 | McCormick | 73/1.85 |
| 4,366,561 A | * | 12/1982 | Klein | 367/77 |
| 4,594,692 A | * | 6/1986 | Read et al. | 367/13 |
| 4,754,438 A | * | 6/1988 | Erich, Jr. | 367/13 |
| 5,113,375 A | * | 5/1992 | Jones, Jr. | 367/13 |
| 5,991,235 A | * | 11/1999 | Allen | 367/40 |
| 6,101,864 A | * | 8/2000 | Abrams et al. | 73/1.01 |
| 6,163,286 A | * | 12/2000 | Lee et al. | 341/143 |
| 6,366,857 B1 | * | 4/2002 | Bird et al. | 702/2 |

* cited by examiner

*Primary Examiner*—Marc S. Hoff
*Assistant Examiner*—Mohamed Charioui
(74) *Attorney, Agent, or Firm*—Blakely, Sokoloff, Taylor & Zafman LLP

(57) ABSTRACT

A method and apparatus for testing components is disclosed. The method involves a system operating to collect data in a certain frequency range, and utilizing signals outside that frequency range to test the system during operation. Such testing may be conducted on a not-to-interfere basis, thereby allowing for testing during operation of systems in continuous use.

36 Claims, 7 Drawing Sheets

METHOD AND APPARATUS FOR TESTING COMPONENTS

BACKGROUND OF THE INVENTION

1. Field of the Invention

The invention generally relates to in-system testing of components and more specifically relates to testing of components while those components are functioning, or testing components in an operating range the components do not operate in during normal system operation.

2. Description of the Related Art

Over the years, several systems have been employed for land seismic exploration. A common system that is currently in use employs vibroseis trucks to impart seismic energy in the form of acoustic waves into the ground. The frequency of these acoustic waves are typically in the range of 10–100 Hz.

Seismic energy reflected from acoustic impedance discontinuities is detected by geophones and the output of the geophones is connected to an instrument box. In the instrument box are signal conditioning devices, A/D converters, a means of recording the data or sending it via telemetry to a recorder at the Recording truck, power supply and a processor.

Because the geophones are often connected together and to the instrument box with cables having connectors, the system is susceptible to a variety of problems. Among other things, rodents and cows can chew on the cables or trample them. Naturally, other forces of nature and other defects in the system can also cause problems. Animals, rainwater, and other forces can lead to degradation in performance of the system. This degradation can be manifested by increased cable resistance, short or open circuits, cross-talk between sensors or chains of sensors, leakage of signals to ground, and other similar manifestations.

As a result of these problems, a variety of tests need to be performed to determine if there is any degradation in the system. In some cases, such as leakage of signals to ground or increased resistance, a compensation factor can be determined. In other cases, such as short or open circuits, data cannot be collected until the problem is repaired, and previously collected data may need to be ignored. Determining when these measures are necessary requires testing connectivity of the sensors to the instrument box, leakage of the sensors and/or their cables, and cross-talk between the cables and their associated cables.

One example of a leakage test would involve sending a test signal to a sensor and observing what signal was received back from the sensor. The changes in characteristics from the test signal to the received return signal would give an indication of how the signal is distorted when it passes along the connection between the sensor and the instrument box or other receiving system. An example of a cross-talk test would involve sending a test signal to a first sensor and observing the signal received from a second sensor with no direct connection to the first sensor. If no signal from the second sensor appeared to be related to the test signal, no cross-talk would be occurring, whereas if a strong signal from the second sensor appeared to be related to the test signal, cross-talk would be occurring. With regard to connectivity, or an open and short circuits test, again a test signal could be sent to a sensor or string of sensors and the response of that sensor or string of sensors observed. Whatever signal or response was received (or not received) would give an indication of whether the sensor in question was not functioning properly. Those skilled in the art will appreciate that other methods of implementing these tests exist.

However, these tests are typically performed during the downtime of the operation, when no information signals are being recorded. Normally, such systems have used modes of operation that always had intervals of dead time, i.e. time when no receive signal activity occurred, during which instruments could be tested to determine their quality. With the introduction of the slip-sweep vibroseis operation there is no interval of dead time during actual operation of the system in which the components can be tested to verify that they are working correctly while the system operates. The slip-sweep vibroseis operation involves sweeping a signal generator through a range of frequencies on a repeated basis, such that each successive sweep overlaps the previous sweep, resulting in not only a constant generation of some signal, but some intervals during which two or more signals are generated simultaneously.

SUMMARY OF THE INVENTION

One embodiment of the present invention is a method of testing a component including operating the component; sending an out-of-band test signal to the component; and observing a response of the component to the out-of-band test signal. Alternatively, the invention may be an apparatus for testing a set of one or more components comprising a signal generator, the signal generator coupled to one or more of the components, the signal generator for generating test signals outside of an operating frequency band of interest; and a receiver, the receiver coupled to one or more of the components, the receiver for receiving signals outside of the operating frequency band of interest.

Likewise, the invention may be an apparatus for testing a set of one or more components including generating means for generating a test signal, the generating means coupled to at least one of the components, the generating means configured to generate a test signal at a frequency outside an operating frequency band of interest of the components; and receiving means configured to receive a response to a test signal, the receiving means coupled to at least one of the components.

Another alternative embodiment of the present invention is a method of testing a component including operating the component, triggering a test signal, the component sending an out-of-band test signal while the component operates, and observing the out-of-band test signal while the component operates.

Additionally, an alternative embodiment of the present invention is a method of testing including operating the component using signals appropriate to the intended purpose of the component, sending a test signal different from the appropriate signals to the component while operating the component, and observing a response of the component to the test signal while operating the component.

BRIEF DESCRIPTION OF THE DRAWINGS

The present invention is illustrated by way of example and not limitation in the accompanying figures.

DETAILED DESCRIPTION

A method and apparatus for testing components is described. A method of testing components in the system is needed that allows the system components to be tested while normally operating, e.g. actually receiving data. Furthermore, the system avoids problems of disturbing data collection or otherwise distorting the data collected by the system while it is tested. In addition, the system avoids damaging system components or otherwise rendering them inoperable. The system tests components that are operating in one frequency range (a sense frequency or operating frequency range or signals appropriate to the operation of the component) with signals in a separate frequency range (a test frequency range). The components respond to the signals in the test frequency range, without interference to the operations in the sense frequency or operating frequency range. As such, this testing can be characterized as out-of-band testing on a not-to-interfere basis.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
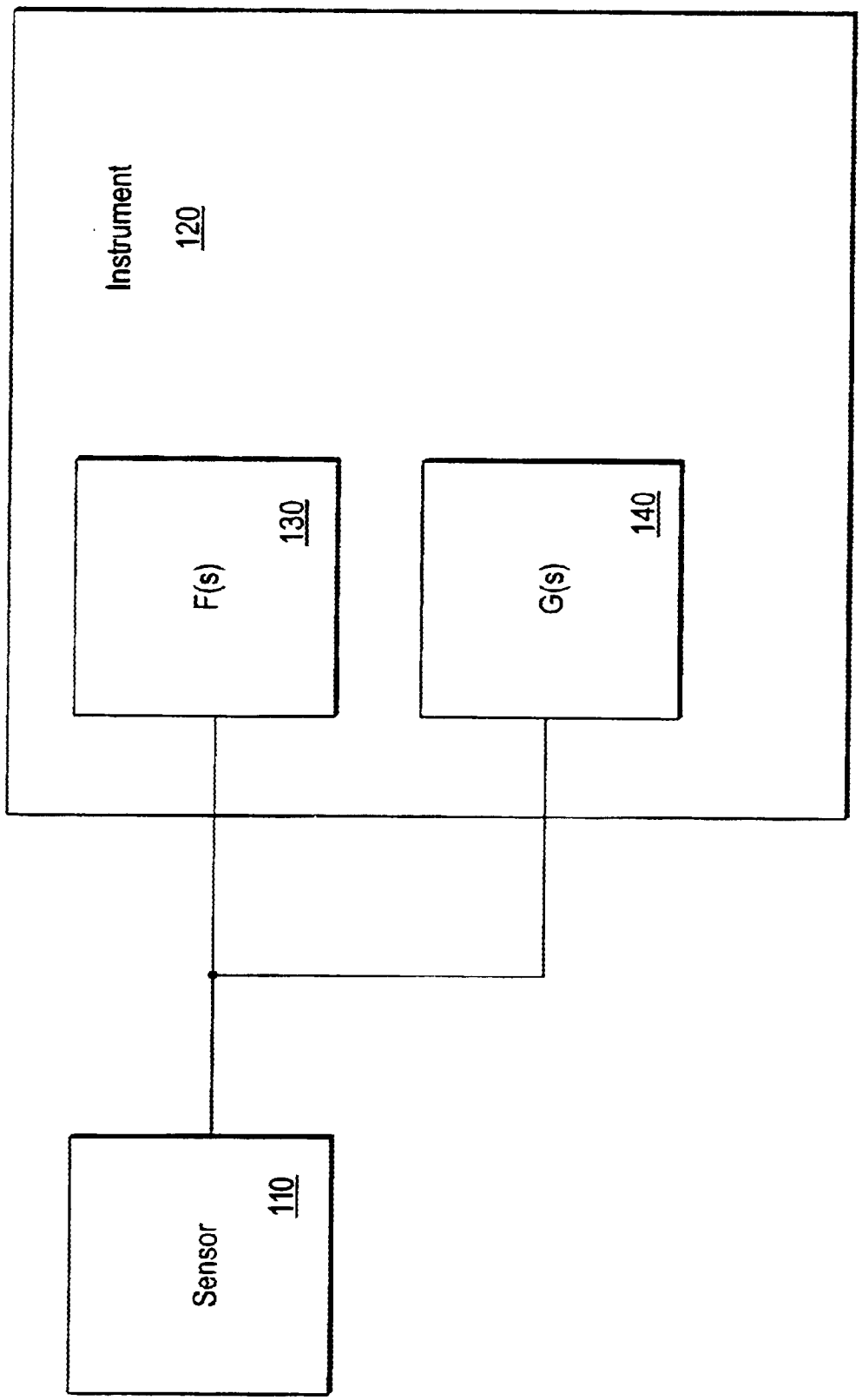
FIG. 1 illustrates one embodiment of a system suitable for out-of-band testing.
Figure 2:
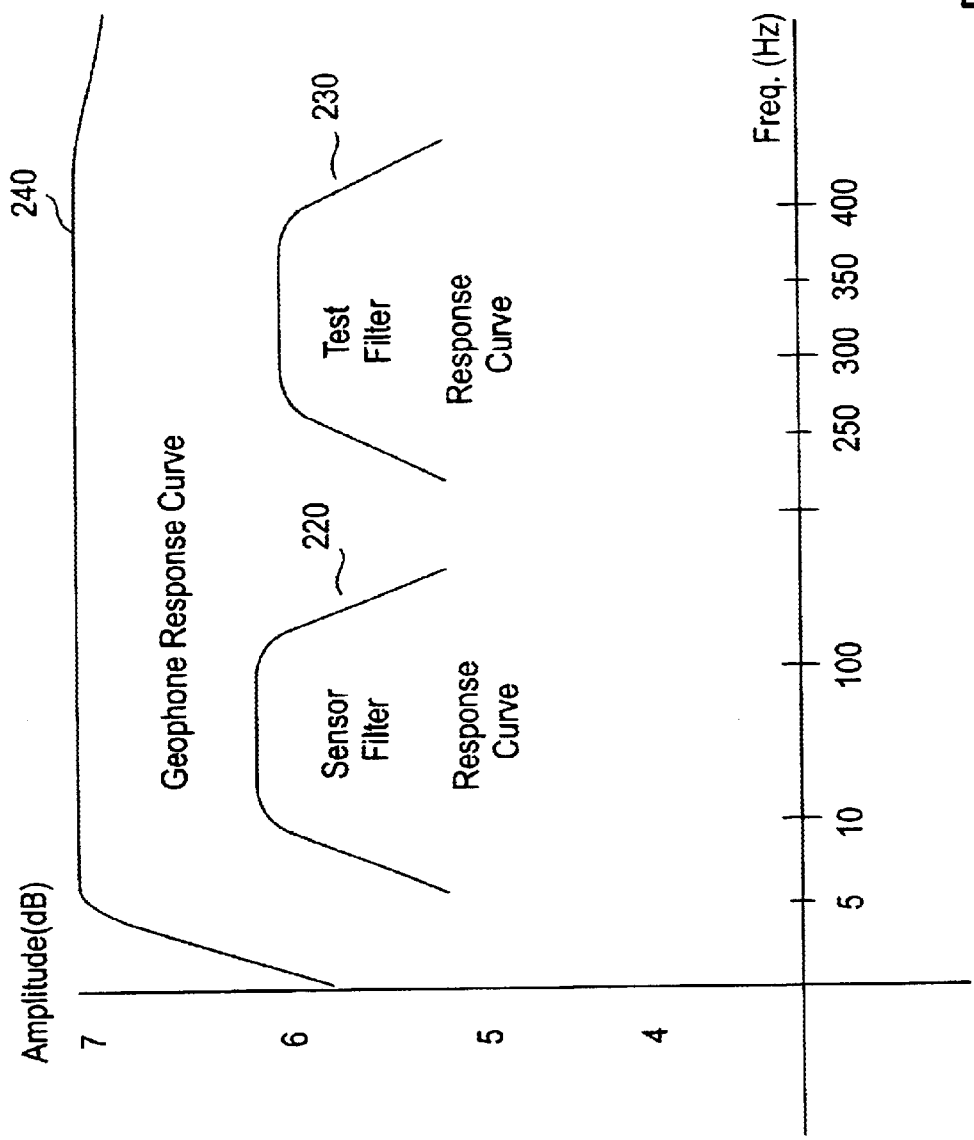
FIG. 2 illustrates an exemplary frequency response of both the sensor and a test unit suitable for out-of-band testing in accordance with the teachings of the present invention.

FIG. 1 illustrates an embodiment of an apparatus suitable for out-of-band testing that operates in accordance with the teachings of the present invention. In the embodiments described, the signals are typically electrical signals. However, the system may be configured to operate on a variety of signals, including optical signals. Instrument 120 is connected to external sensor 110. Instrument 120 includes sensor apparatus 130 and testing apparatus 140. An exemplary frequency response for a sensor apparatus and a testing apparatus is shown in FIG. 2 where the overlap between the sensor response and the test response is an area with a relatively low response for either component. It has been determined that instrument 120 can function more efficiently when it can determine whether sensor 110 is functioning properly during gathering of data. In order to test sensor 110 while sensor 110 is receiving data, test apparatus 140 sends signals to and examines signals from sensor 110.

To achieve testing of sensor 110 during gathering of data, the data signals and the test signals must be such that they will not interfere. One way to do this is to use signals out of the sense range. The sense range referred to herein is the frequency range of signals utilized in the collection of data. However, these test signals must be at a frequency which will allow sensor 110 to respond. The test signals must also be at a frequency and amplitude such that sensor 110 is not damaged. Additionally, the test signals should not cause the sensor apparatus 130 to receive any incorrect data.

An exemplary response curve for the sensor is illustrated by curve 210 in FIG. 2. In the present example, sensor apparatus 130 examines signals from sensor 110 in the frequency range of 10 to 100 Hz as shown by curve 220. However, sensor 110 responds to signals in a much broader frequency range as shown by curve 210. Thus, a test range out of the 10–100 Hz range may be used for testing. For example, test signals in the 250 to 350 Hz range (as illustrated by curve 230) are sufficiently removed from the 10 to 100 Hz range of sensor apparatus 130 yet an acceptable frequency response from sensor 110 is exhibited. As a result, instrument 120 may test whether sensor 110 is functioning properly while instrument 120 is receiving data from sensor 110 in sensor apparatus 130.

It will be appreciated that the illustration in FIG. 2 is exemplary. A test signal may be any signal not appropriate to the operation of the sensor at the time of operation of the sensor. The test signal need not produce a response in the sensor of the same magnitude as the responses produced by signals that are appropriate to the operation of the signal, so long as the response may be measured and used to verify some aspect of the operation or connectivity of the sensor. Thus, the test signals of FIG. 2 would still be useful if the response of the sensor was 5 dB or 10 dB less in the test signal range than in the range of signals appropriate to operation of the sensor during the test for example.

Additionally, a desirable relationship between the test signal and signals appropriate to operation of the sensor may be described as two signals which are orthogonal or nearly so, such that the test signal does not unduly interfere with the operation of the sensor with respect to signals appropriate to operation of the sensor. Orthogonality of functions may be expressed mathematically as:

$$\int h(n)y(n)dn = 0$$

Where $h(n)$ and $y(n)$ are functions representing the test signal and a signal appropriate to operation of the sensor respectively. It will be appreciated that such orthogonality need not be as absolute as defined by the equation, that for purposes of this description, orthogonality is satisfied where the two signals do not cause interference while they operate simultaneously, so two signals may be considered orthogonal when they satisfy the relationship:

$$\int h(n)y(n)dn \approx 0$$

or such that the two signals cause at most a small amount of interference. It will be appreciated that orthogonality may be achieved by using non-interfering frequencies for the signal appropriate for the operation of the sensor and the test signal as illustrated in FIG. 2. However, it will be appreciated that orthogonality may also be achieved by exploiting other relationships between a test signal and a signal appropriate to the operation of the sensor. As an example, if a sensor may record motion in both an x and a y direction which are perpendicular to each other, and the signal appropriate to the operation of the sensor causes the sensor to move only in the y direction, then a test signal which causes the sensor to move in the x direction would be orthogonal to the signal appropriate to the operation of the sensor because two directions are orthogonal if they are perpendicular to each other in Euclidean space. As will be appreciated, orthogonality may be achieved in innumerable manners, such as spatial orthogonality, orthogonality in the time domain (orthogonality in time), or orthogonality in the frequency domain, for example. All of these manners of achieving orthogonality fit the criteria just described.

Note that the signals appropriate to the operation of the sensor will depend on the intended use of the sensor, such that, for example, if a geophone were used to sense signals in the 10 to 300 Hz range, the 250 to 350 Hz would no longer include only signals not appropriate to the operation of the geophone. However, the 450–550 Hz range, for example, would then be a more useful range of frequencies in which to send a test signal.

Ultimately, the sensitivity of the sensor must be considered when choosing signals not appropriate to the operation of the sensor for testing purposes, but most sensors have transfer functions which are understood well enough such that a response to a test signal may be measured and utilized effectively merely be adjusting to the transfer function or response curve of the sensor for the test signal in question. Thus, as long as some form of truth table or response curve exists for the signals, both appropriate and not appropriate to the operation of the sensor, the sensor may be tested by using the signals not appropriate to operation of the sensor and compensating for the sensor's response thereto.

In the present embodiment, instrument 120, includes both sensor apparatus 130 and testing apparatus 140. It should be noted that this configuration is exemplary and it is contemplated that the sensor apparatus 130 and testing apparatus 140 may be embodied in one or more separate devices or instruments.

In one embodiment, sensor apparatus 130 and test apparatus 140 include filters such that the apparatus 130 and 140 process the proper signals as specified by the frequency range of operation. Thus in the example discussed herein, sensor apparatus 130 may include a filter that filters out-of-band signals, e.g. filters out signals not within or near the 10–100 Hz range of operation. Testing apparatus 140 may include a filter that filters out signals within the 10–100 Hz range.

The filters used may be analog or digital filters or embodied in digital signal processors. Furthermore, the filter functions may be combined with other functions of the device. For example, sensor apparatus 130 may also include recording or transmission functionality to record the sensed data or transmit the data to a central processing or recording facility. The sensor apparatus may alternately include processing capability to perform processing on the received sensed signal. Similarly, testing apparatus 140 may also include the necessary components to initiate and/or process received test signals.

Figure 3:
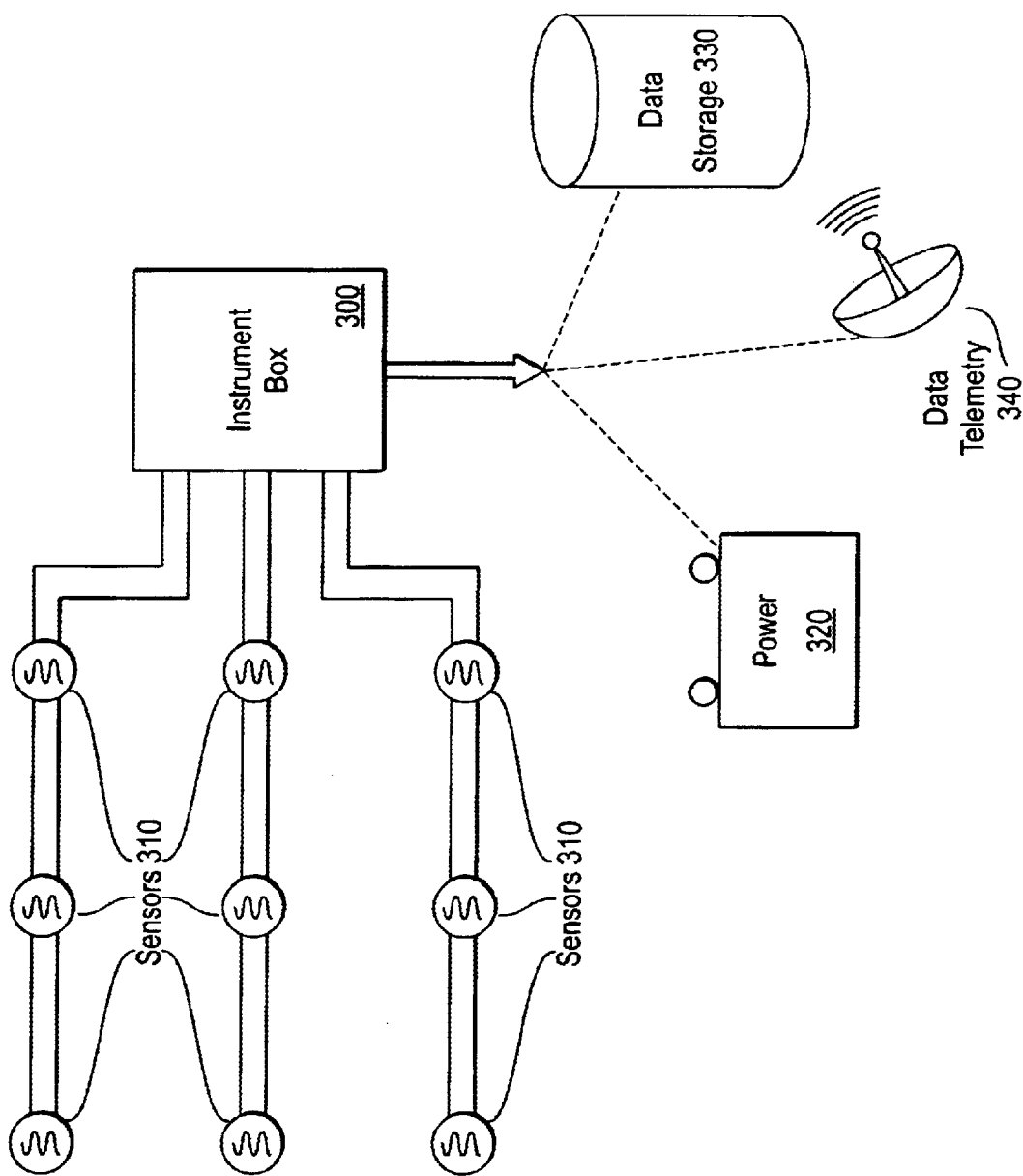
FIG. 3 illustrates an alternative embodiment of a system suitable for out-of-band testing in accordance with the teachings of the present invention.

Turning to FIG. 3, another embodiment of an apparatus suitable for out-of-band testing is illustrated. Instrument box 300 is connected to a network of sensors 310. Each sensor 310 in this embodiment is identical and each is connected to instrument box 300 through a two-wire connection. Other types of sensors and other types of connections may be used. Instrument box 300 is also connected to power 320 and data storage 330 or data telemetry 340. Sensors 310 are deployed such that they are laid out over a wide area of ground. In the present embodiment, instrument box 300 is configured to sense and record signals generated during operation. In addition, instrument box 300 includes the filters and functionality to test the sensors and line connections. Thus, in one embodiment, instrument box 300 is able to determine whether sensors 310 are functioning at any given time and whether unacceptable cross-talk or leakage is occurring. In addition, instrument box 300 sends test signals out to sensors 310 to determine whether they are functioning properly. Additionally, in accordance with typical instrument operation, instrument box 300 receives data from sensors 310 and can control sensors 310.

Figure 4:
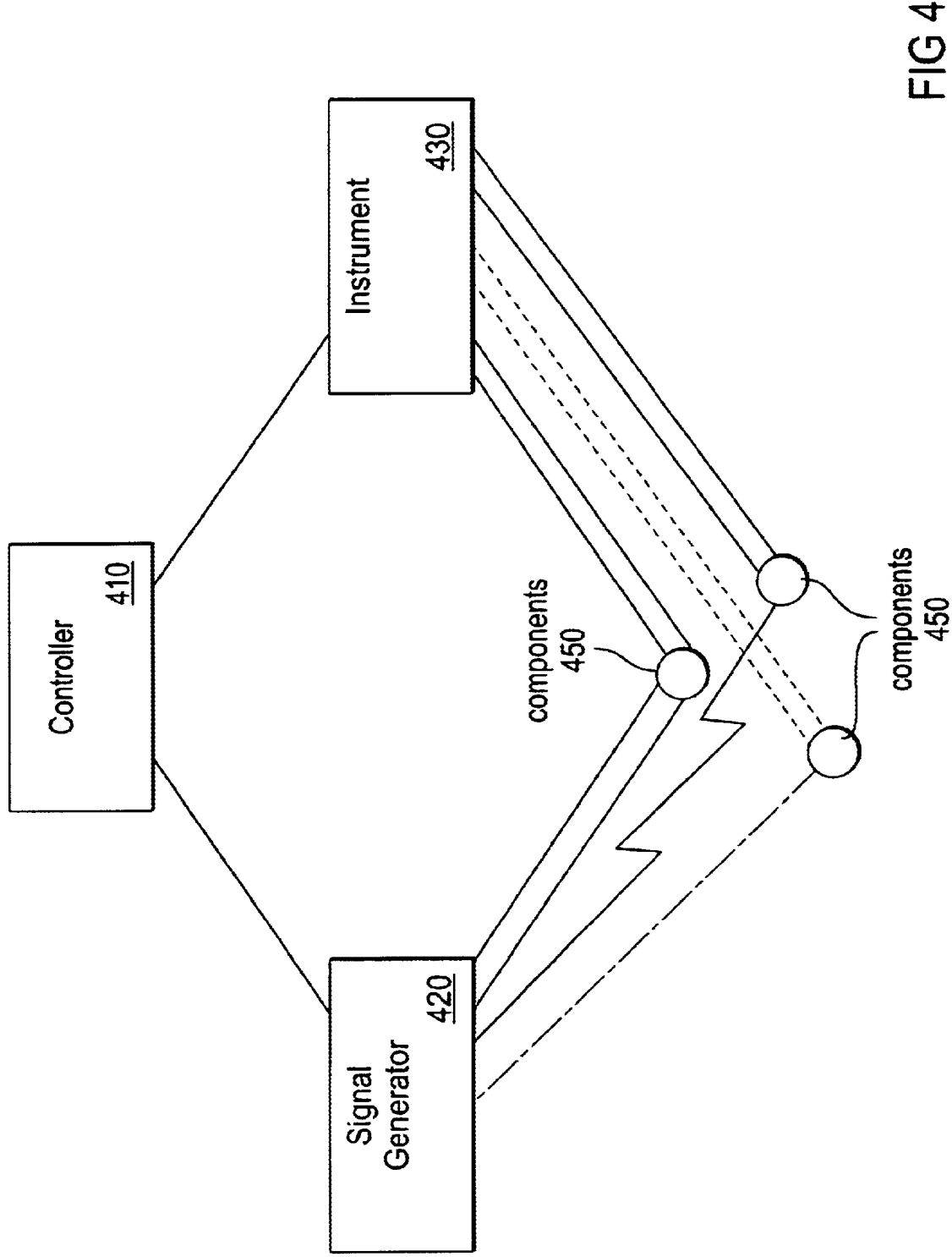
FIG. 4 illustrates an alternative embodiment of a system suitable for out-of-band testing in accordance with the teachings of the present invention.

FIG. 4 illustrates an alternative embodiment of a system that operates in accordance with the teachings of the present invention. Controller 410 is coupled to instrument 430 and signal generator 420. Instrument 430 may be coupled to components 450 in two different ways. For instance, instrument 430 can be coupled to two components 450 through two-wire connections, possibly with intermediate devices interposed, and connected to a third component 450 via a radio link that may or may not require intermediary devices. Likewise, signal generator 420 is shown coupled to each of three components 450 through a different way. For instance, signal generator 420 may be coupled to a first component 450 through a cable or two-wire connection, to a second component 450 through a radio connection, and to a third component 450 through an optical or line-of-sight connection. Other methods of connecting components, such as but not limited to buses, carrier waves in general, and physical connection, may be suitable as well.

In the embodiment of FIG. 4, the controller 410 controls and coordinates the operation of signal generator 420 and instrument 430 such that data collection by instrument 430 will be useful. Likewise, controller 410 controls and coordinates such that test signals generated by signal generator 420 can be utilized by instrument 430 to test components 450 or connections to components 450. Note that controller 410, signal generator 420 and instrument 430 may be integrated together, may be discrete objects, and may each be collections of components.

Figure 5:
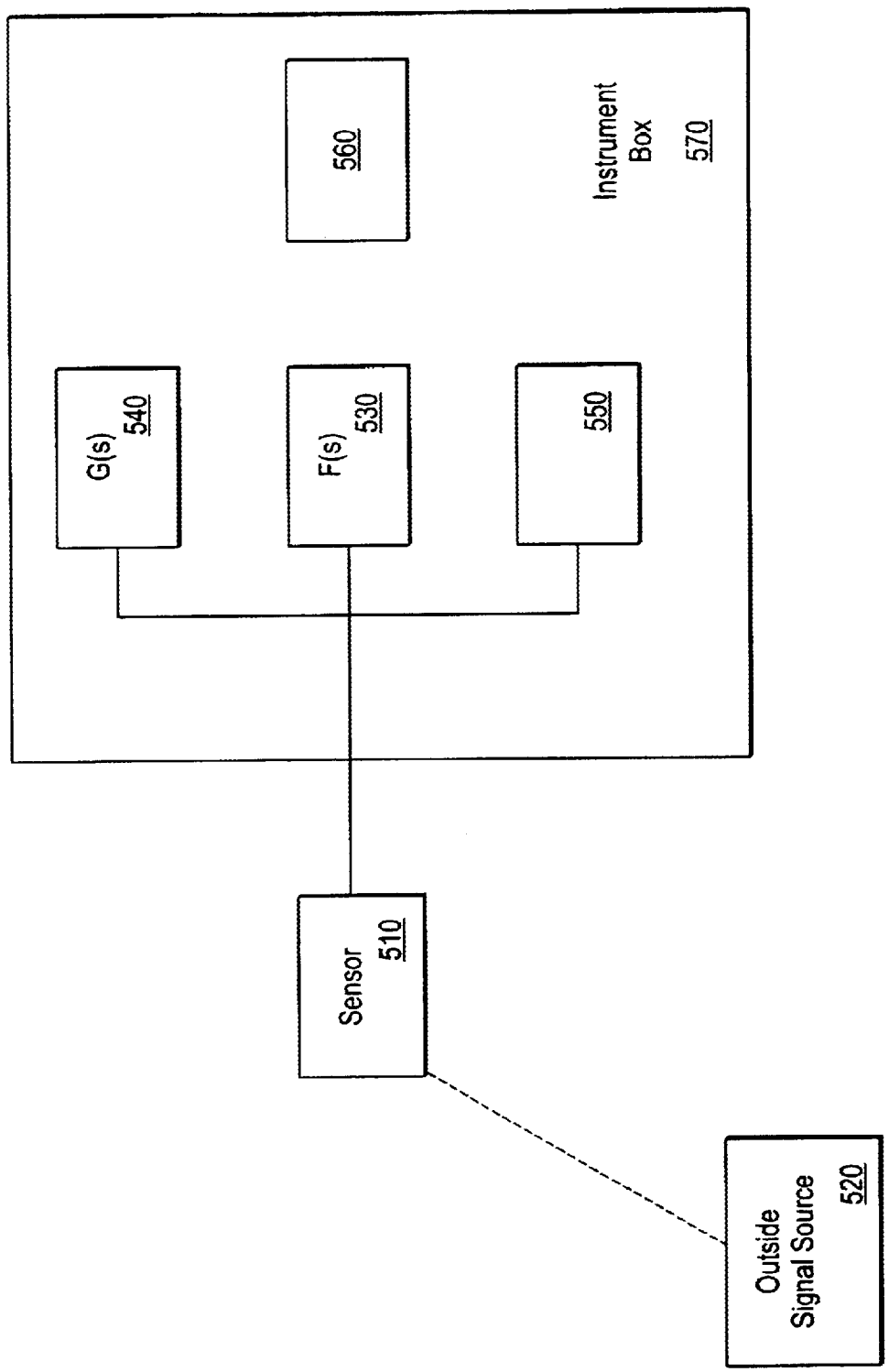
FIG. 5 further illustrates an alternative embodiment of a system suitable for out-of-band testing in accordance with the teachings of the present invention.

Turning to FIG. 5, another embodiment is illustrated. Instrument box 570 is coupled to sensor 510. Instrument box 570 includes sense apparatus 530, test apparatus 540, and signal generator 550. It also includes controller 560, which controls and coordinates the actions of sense apparatus 530, test apparatus 540 and signal generator 550. Note that controller 560 need not be separate from any of the other components of instrument box 570, it may be integrated into or distributed among the components. Sensor 510 operates to receive signals from outside signal source 520, which may be a controlled signal source such as a vibroseis truck, an uncontrolled signal source such as a dynamite chirp, or simply the ambient environment. Sense apparatus 530 receives data from sensor 510. Signal generator 550 may send signals to sensor 510, and test apparatus 540 may receive signals or data from sensor 510.

In the out-of-band case, signal generator 550 produces signals out of the band most suitable for use by sense apparatus 530, but within a band suitable for use by test apparatus 540. In that case, test apparatus 540 detects the signals generated by signal generator 550 as reflected back or processed by sensor 510. In the process, information on the performance of sensor 510 and connectivity to sensor 510 is gained. Since the signals generated are out of the band utilized by sense apparatus 530, the performance of sensor 510 and sense apparatus 530 are not affected. Note that the block diagram illustrates a simple coupling between the various components. In one embodiment, the coupling may be such that the same signal sent from signal generator 550 to sensor 510 is also sent to sense apparatus 530 and test apparatus 540 directly. In an alternative embodiment the coupling might be such that sense apparatus 530 and test apparatus 540 do not receive the signal sent to sensor 510 by signal generator 550.

Figure 6:
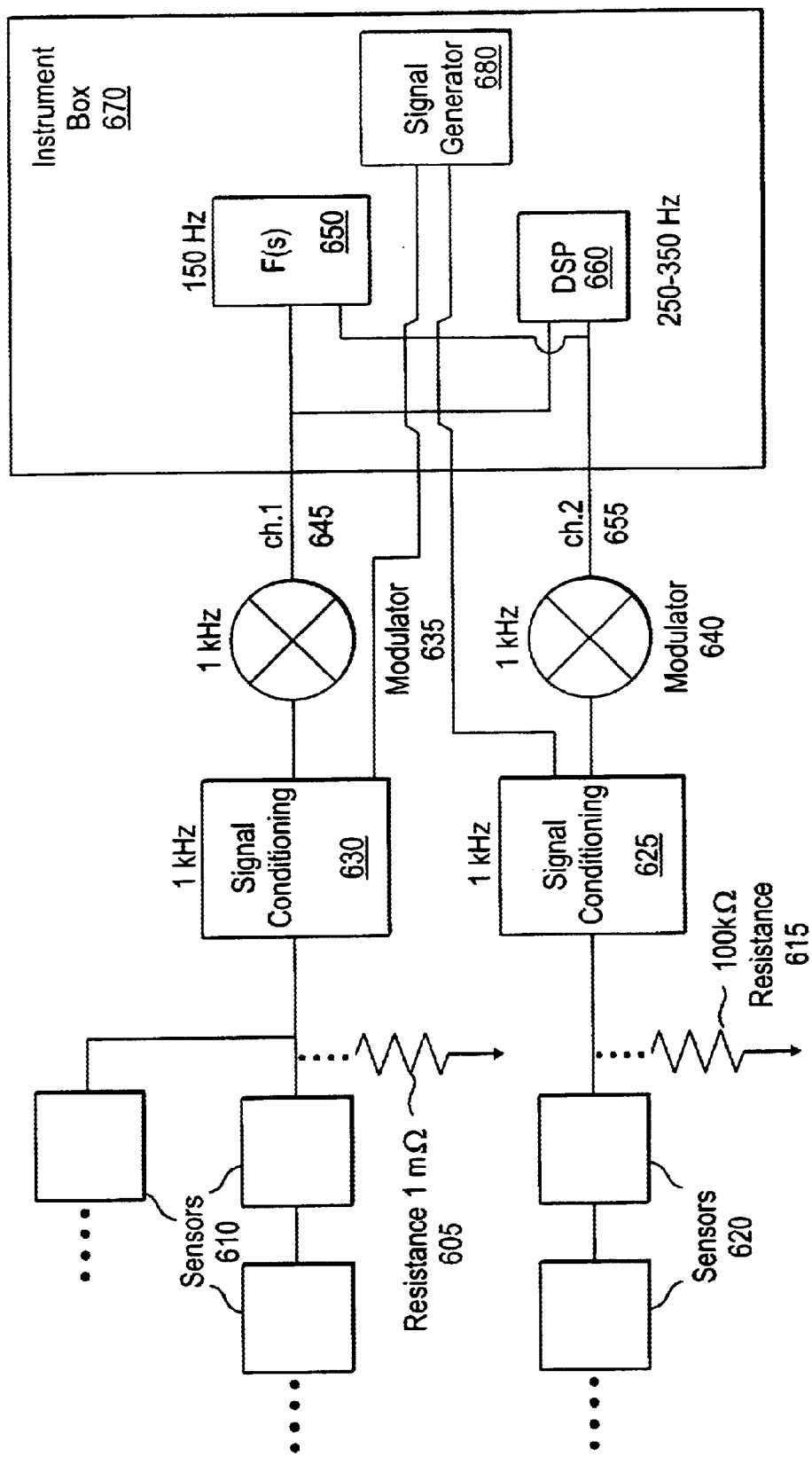
FIG. 6 also illustrates an alternative embodiment of a system suitable for out-of-band testing in accordance with the teachings of the present invention.

Turning to FIG. 6, a detailed illustration of an alternative embodiment is displayed. Instrument box 670 includes communications channel 1 (645) and channel 2 (655), sense apparatus 650, test apparatus 660 and signal generator 680. Sense apparatus 650 has, in one embodiment, a lowpass filter with a cutoff (3 db) at 150 Hz. Test apparatus 660 is, in one embodiment, a digital signal processor (DSP) programmed to have a bandpass filter with a range of 250–350 Hz. Signal generator 680 is, in one embodiment, a component capable of generating signals, preferably in the 250–350 Hz range.

Communications channel 1 (645) is coupled to modulator 635, which is designed to work optimally for frequencies below 1 kHz. Modulator 635 is coupled to signal conditioner 630, which is also designed to work optimally for frequencies below 1 kHz. Signal conditioner 630 is coupled to sensors 610, which are connected together in a series-parallel arrangement. Resistance 605 is, for example, a 1 Mega-ohm parasitic resistance to ground associated with the coupling of sensors 610 to signal conditioner 630. Communications channel 2 (655) is coupled to modulator 640, which is coupled to signal conditioner 625. Both modulator 640 and signal conditioner 625 may be designed to work optimally for frequencies below 1 kHz. Signal conditioner 625 is coupled to sensors 620, and resistance 615 is, for example, a 100 kilo-ohm parasitic resistance to ground associated with this coupling. Signal Generator 680 is coupled to Signal conditioner 625 and Signal conditioner 630.

In one embodiment, Signal conditioners 625 and 630 are two-way filters designed to protect Instrument box 670 and its components from unintended electrical signals. Such unintended electrical signals may include lightning strikes, and may also include other over-voltage or under-voltage signals such as those associated with static electricity for example. Furthermore, in one embodiment, Modulators 640 and 635 are sigma-delta modulators used for conversion of signals from analog to digital form. In such an embodiment, a corresponding digital-to-analog converter may also be included in Signal Generator 680 for purposes of converting digital signals to analog signals to which Sensors 610 may respond.

Instrument box 670 coordinates the actions of sense apparatus 650, test apparatus 660, and signal generator 680. During a slip-sweep operation, sense data is received in sense apparatus 650 continuously. However, signal generator 680 sends signals in the 250–350 Hz band to sensors 610 or sensors 620 through Signal conditioner 625 or Signal conditioner 630 respectively. Test apparatus 660 then receives returning test signals from sensors 610 and sensors 620, and may also receive signals from signal generator 680 directly back through signal conditioners 625 and 630 and modulators 635 and 640, thereby allowing for out-of-band testing on a not-to-interfere basis while the system operates. A leakage test of communications channel 1 (645) would likely give an indication of the presence of resistance 605, and allow instrument box 670 to flag or compensate for the resulting degradation in signals. A similar leakage test on communications channel 2 (655) would likely give an indication of the presence of resistance 615. Likewise, such a leakage test might give an indication of open or short circuits within the connections, such as a break in the connections between sensors 610 and signal conditioning 630 due to a rodent attack. A cross-talk test in which a signal is injected by signal generator 680 into communications channel 1 (645) and the return signal was observed by test apparatus 660 on communications channel 2 (655) would give an indication of how much cross-talk occurred between the channels.

It should be noted again that signal generator 680 and test apparatus 660 do not need to be located in receiver box 670. Signal generator 680 may be attached to Modulators 635 and 640 and just as easily inject signals into the network of communications channels 1 (645) and 2 (655). Likewise, test apparatus 660 may be housed separately and coupled to both channel 1 (645) and channel 2 (655), or coupled to only one of the two channels. Furthermore, both signal generator 680 and test apparatus 660 may be coupled to the system at virtually any point in the system and still provide some ability to test the system. Also, multiple signal generators and testing apparatuses may be utilized as appropriate. In particular, signal generators may be coupled to each geophone, allowing for individualized testing of the connection between each geophone and a instrument box.

The present invention can be configured to operate in different frequency ranges than those discussed herein. Alternate ranges of operation and testing may be used to meet system or environmental requirements. In addition, the 250–350 Hz frequency range of test apparatus 660 may be adjusted. Within the confines of the system, it appears that the restrictions on useful signals are imposed by the modulators (635, 640) and the signal conditioning components (625, 630). As a result, any frequency below 1 kHz may be appropriate for testing the system. Likewise, different components may be tested, such that a signal generator connected to the coupling of signal conditioning 630 and sensors 610, in conjunction with a test apparatus connected to the coupling of signal conditioning 630 and modulator 635 could be used to test the functioning of signal conditioning 630 during operation of the system. Additionally, signal generators and test apparatus may be used to test connections to power or data storage such as those illustrated in FIG. 3.

Figure 7:
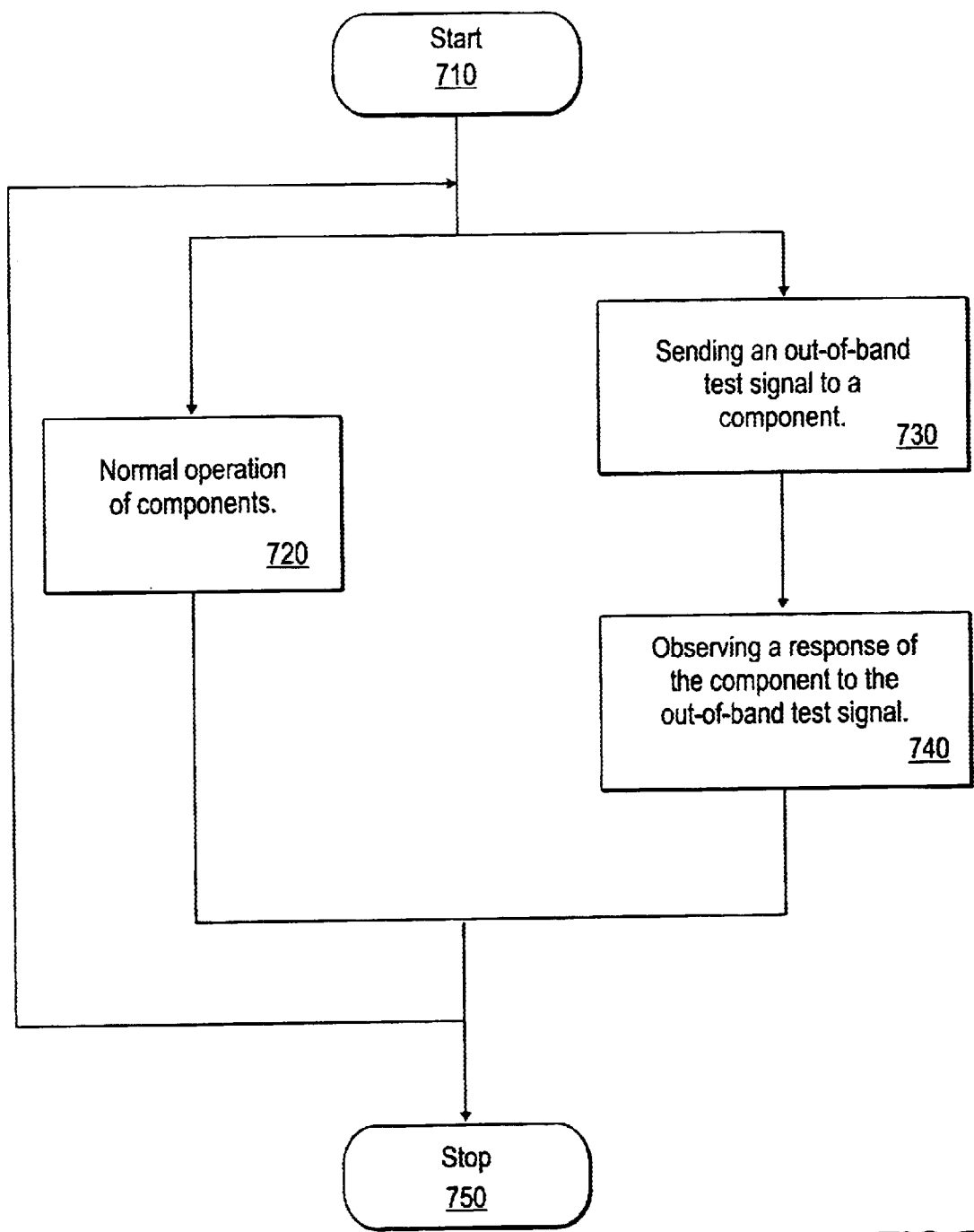
FIG. 7 illustrates the process employed in accordance with the teachings of the present invention.

As further illustration of the method of the present invention, FIG. 7 illustrates a flow diagram of the method. The method begins with initialization step Start 710. Following that, the method branches into two paths. Along the first path, the method flows to operation 720, where the components operate normally. In one embodiment, operation 720 is exemplified by sensors receiving data, disk drives recording data, or power supplies supplying power. Along the second path, the method flows to signaling 730 and then to observing 740. In one embodiment, signaling 730 is exemplified by a signal generator sending a test signal at an out-of-band frequency to a component. Likewise, in one embodiment, observing 740 is exemplified by a receiver receiving the reflected or returned test signal, or the response signal, from a component to be tested. From each of the two paths, the method then flows either back to repeat one or both paths again, or to termination step 750.

While this method of testing was developed for vibroseis slip-sweep operation, one skilled in the art will readily see the applicability of this method to other forms of sensor and receiver apparatuses and other systems using a two-wire or multi-wire systems for connection. Any system in which a signal can be sent and received over the same wires or through the same connection is suitable for such testing as open and shorts testing, cross coupling between channels, and leakage testing. Furthermore, when an out-of-band signal generator is connected to a component to be tested, the system need only receive the test signals through the connection, so a one-way connection may be sufficient. Alternatively, the system may transmit a signal to induce or trigger a test signal, and then receive the test signal. Therefore, using out-of-band signals to test on a not-to-interfere basis while signals are being received in the signal band may be applied to a wide range of applications. A system may be any collection of components operating cooperatively, it may be integrated tightly or distributed across multiple locations or pieces of equipment, and components need not be housed in a single piece of equipment or location, either. Likewise, sensors are not the only types of components that may be tested in the manner described above.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of testing a component comprising:
   operating the component using signals appropriate to the intended purpose of the component;
   sending an out-of-band test signal to the component while operating the component during data collection with the test signal orthogonal to the appropriate signals; and
   observing a response of the component to the out-of-band test signal while operating the component.

2. The method of claim 1 wherein:
   observing a response is performed by a testing component.

3. The method of claim 2 wherein:
   the component and the testing component each comprise a portion of a system.

4. The method of claim 1 wherein:
   sending an out-of-band test signal comprises sending an out-of-band test signal to a first component; and
   observing a response comprises observing a response of a second component to the out-of-band test signal.

5. The method of claim 1 wherein:
   the component is a geophone.

6. The method of claim 1 wherein:
   the component is selected from the group comprising a geophone, a power supply, and a data storage device.

7. The method of claim 1 wherein:
   the out-of-band signal is in a range of frequencies selected from the group comprising those frequencies higher than a sense frequency of the component and those frequencies lower than a sense frequency of the component.

8. The method of claim 1 wherein:
   observing a response yields an indication selected from the group comprising an indication of whether the component is connected to a system, an indication of the quality of the connection between the component and the system, an indication of a connection between a first component and a second component, and an indication of a desirable compensation factor for improving a connection between the component and the system.

9. An apparatus for testing a set of one or more components while the components operate comprising:
   a signal generator, the signal generator coupled to one or more of the components, the signal generator for generating test signals outside of a sense frequency band during data collection, wherein the test signals are orthogonal to one or more appropriate signals; and
   a receiver, the receiver coupled to one or more of the components, the receiver for receiving signals outside of the sense frequency band, and the appropriate signals within the sense frequency band.

10. The apparatus of claim 9 wherein:
    at least one of the components of the set of one or more components are selected from the group comprising geophones, power supplies, and data storage devices.

11. The apparatus of claim 9 wherein:
    the signal generator is integrated into a receiver box;
    the receiver is integrated into the receiver box; and
    geophones are coupled to the receiver box.

12. The apparatus of claim 9 wherein:
    the signal generator coupled to a first component;
    and the receiver coupled to the first component.

13. The apparatus of claim 9 wherein:
    the signal generator coupled to a first component;
    and the receiver coupled to a second component.

14. The apparatus of claim 9 wherein:
    the receiver is integrated with a second receiver, the second receiver for receiving signals within the sense frequency band.

15. The apparatus of claim 9 wherein:
    the test signals generated by the signal generator are at a frequency selected from the group of frequencies comprising frequencies higher than the frequency of the sense frequency band and frequencies lower than the frequency of the sense frequency band.

16. The apparatus of claim 9 further comprising:
    a controller, the controller coupled to the signal generator, the controller coupled to the receiver.

17. The apparatus of claim 9 wherein:
    the signal generator coupled to at least one of the components in a way selected from the group comprising transmission of signals through the ground, a twisted pair link, a radio link, and an optical link.

18. An apparatus for testing a set of one or more components comprising:
    generating means for generating a test signal during data collection, the generating means coupled to at least one of the components, the generating means for generating a test signal at a frequency outside a sense frequency band of the components wherein the test signals are orthogonal to one or more appropriate signals; and
    receiving means for receiving a response to a test signal and the appropriate signals, the receiving means coupled to at least one of the components.

19. The apparatus of claim 18 further comprising:
    controlling means coupled to the generating means and coupled to the receiving means, the controlling means for controlling the generating means and the receiving means.

20. The apparatus of claim 18 wherein:
    the generating means coupled to a first component;
    and the receiving means coupled to the first component.

21. The apparatus of claim 18 wherein:
    the generating means coupled to a first component;
    and the receiving means coupled to a second component.

22. The apparatus of claim 18 wherein:
    the receiving means is integrated with a second receiving means, the second receiving means for receiving signals within the sense frequency band.

23. The apparatus of claim 18 wherein:

the test signals generated by the generating means are at a frequency selected from the group of frequencies comprising frequencies higher than the frequency of the sense frequency band and frequencies lower than the frequency of the sense frequency band.

24. A method of testing a component comprising:

operating the component using signals appropriate to the intended purpose of the component wherein a test signal is orthogonal to the appropriate signals;

sending the test signal different from the appropriate signals to the component while operating the component during data collection; and observing a response of the component to the test signal while operating the component during data collection.

25. The method of claim 24 wherein:

the appropriate signals include signals in a first range of frequencies and the test signal involves a frequency outside the first range of frequencies.

26. The method of claim 24 wherein:

sending a test signal comprises sending the test signal to a first component; and observing a response comprises observing a response of a second component to the test signal.

27. The method of claim 24 wherein:

observing a response is performed by a testing component.

28. A method of testing a component comprising:

operating the component using signals appropriate to the intended purpose of the component;

sending a test signal to the component while operating the component, the test signal orthogonal to the appropriate signals in a manner other than orthogonal in time; and observing a response of the component to the test signal while operating the component.

29. The method of claim 28 wherein:

the appropriate signals include signals in a first range of frequencies and the test signal involves a frequency outside the first range of frequencies.

30. The method of claim 28 wherein:

sending a test signal comprises sending the test signal to a first component; and observing a response comprises observing a response of a second component to the test signal.

31. The method of claim 28 wherein:

observing a response is performed by a testing component.

32. The method of claim 28 wherein:

the appropriate signals include signals causing the sensor to sense motion in a first direction and the test signal includes signals causing the sensor to sense motion in a second direction, the second direction orthogonal to the first direction.

33. The method of claim 28 wherein the test signal is spatially orthogonal to the operating signals.

34. A method of testing a component comprising:

operating the component;

triggering a test signal;

the component sending an out-of-band test signal while the operating occurs wherein the test signal is orthogonal to appropriate signals used while operating the component; and observing the out-of-band test signal while the operating occurs.

35. A method of testing a component comprising:

operating the component during data collection;

sending an out-of-band test signal to the component while operating the component during data collection; and observing a response of the component to the out-of-band test signal while operating the component; and wherein observing a response yields an indication selected from the group comprising an indication of whether the component is connected to a system, an indication of the quality of the connection between the component and the system, an indication of a connection between a first component and a second component, and an indication of a desirable compensation factor for improving a connection between the component and the system.

36. A method of testing a component comprising:

operating the component to receive signals outside a test signal range;

sending an out-of-band test signal to the component while operating the component during data collection, the out-of-band test signal within the test signal range; and observing a response of the component to the out-of-band test signal while operating the component.

* * * * *